United States Patent
Humphries et al.

(10) Patent No.: US 7,400,598 B1
(45) Date of Patent: Jul. 15, 2008

(54) POLYMORPHIC BROADCAST AND MULTICAST SERVICES FOR WIRELESS NETWORKS

(75) Inventors: Thomas S. Humphries, Cedar Rapids, IA (US); Raja Kambhampati, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 436 days.

(21) Appl. No.: 11/159,459

(22) Filed: Jun. 23, 2005

(51) Int. Cl.
*H04B 7/00* (2006.01)
*H04B 7/14* (2006.01)
*H04J 1/10* (2006.01)
*H04J 3/08* (2006.01)
*H04L 12/28* (2006.01)
*H04L 12/56* (2006.01)

(52) U.S. Cl. .................. 370/315; 370/310; 370/351; 370/389; 370/400

(58) Field of Classification Search ............... 370/310, 370/315, 351, 389, 400
See application file for complete search history.

(56) References Cited

U.S. PATENT DOCUMENTS

| | | | | |
|---|---|---|---|---|
| 5,987,011 | A * | 11/1999 | Toh ........................... | 370/331 |
| 6,816,460 | B1 * | 11/2004 | Ahmed et al. ............... | 370/238 |
| 6,961,541 | B2 * | 11/2005 | Overy et al. ............... | 455/41.2 |
| 7,092,943 | B2 * | 8/2006 | Roese et al. ................... | 707/9 |
| 7,171,476 | B2 * | 1/2007 | Maeda et al. ................ | 709/227 |
| 7,190,961 | B2 * | 3/2007 | Burr ........................... | 455/502 |
| 2002/0163912 | A1 * | 11/2002 | Carlson ..................... | 370/392 |
| 2004/0203380 | A1 * | 10/2004 | Hamdi et al. ............... | 455/41.2 |
| 2005/0255848 | A1 * | 11/2005 | Cohen ........................ | 455/445 |
| 2006/0045087 | A1 * | 3/2006 | Kurby ........................ | 370/390 |
| 2006/0062175 | A1 * | 3/2006 | Ling et al. .................. | 370/328 |
| 2006/0259597 | A1 * | 11/2006 | Jiang et al. .................. | 709/222 |

OTHER PUBLICATIONS

B. Karp and H. Kung. Greedy Perimeter Stateless Routing. In Proceedings of the Sixth Annual ACM/IEEE International Conference on Mobile Computing and Networking (Mobicom 2000), 2000.*

* cited by examiner

*Primary Examiner*—Lester Kincaid
*Assistant Examiner*—Nathan Mitchell
(74) *Attorney, Agent, or Firm*—Nathan O. Jensen; Kyle Eppele

(57) ABSTRACT

A method of communicating in a wireless ad-hoc communications network is disclosed. The network includes a plurality of nodes configured for wireless communication therebetween. According to the method, a receiving node receives a message originating from a source node. The receiving and source nodes are included in the network. It is determined whether the receiving node is of a node type intended to process the message. It is determined whether the receiving node is less than a predetermined distance from the source node. The message is processed by the receiving node when the receiving node is of the node type intended to process the message and when the receiving node is less than a predetermined distance from the source node.

18 Claims, 3 Drawing Sheets

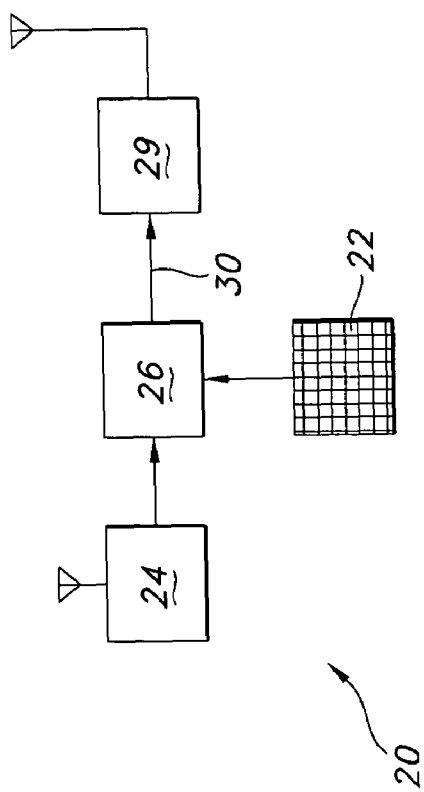
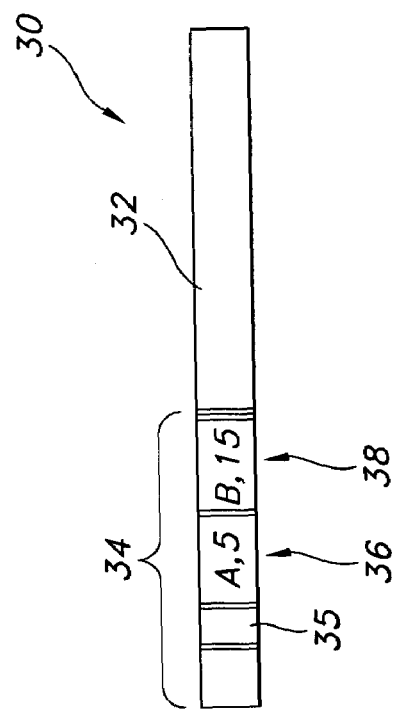

POLYMORPHIC BROADCAST AND MULTICAST SERVICES FOR WIRELESS NETWORKS

FIELD OF THE INVENTION

The invention relates to mobile communications networks, and more particularly, to methods of efficiently using broadcast resources within such networks.

BACKGROUND OF THE INVENTION

Ad-hoc networks are groups of interconnected devices, such as computers or transceivers, in which the topology and/or connectivity of the network may change at any time. Ad-hoc networks are advantageously used in circumstances where a plurality of devices desire or are required to communicate with each other.

In a wireless network, bandwidth is driven by the available RF spectrum, which is currently a scarce commodity. In this environment the most significant challenge associated with a broad-band wireless network is efficiently using the limited bandwidth provided by the network. This problem is made worse by the needs of a distributed network, which requires most or all of the nodes in the network to broadcast and/or multicast information to thereby pass the information through the network. Such broadcasting can take up a great deal of system bandwidth since a message may need to be repeated throughout the system. In a wired internet protocol (IP) based network, reducing the system load of broadcast services is resolved by isolating the broadcast area to a defined region of the network. In a mobile ad-hoc network, however, such isolation is not possible because the IP addresses do not represent a defined group of people within a fixed geographic region or location.

One type of mobile ad-hoc network in which broadcast communications may be overtaxed comprises a plurality of military resources or nodes such as tanks, infantry, unmanned aerial vehicles (UAVs), autonomous sensors, helicopters, and fixed-wing aircraft. A request for helicopter assistance by an infantry unit, for example, would be transmitted to non-helicopter nodes throughout the network. Furthermore, because many of the military nodes are mobile, the request directed to helicopters would likely be sent to helicopters beyond a range that would be useful to assist the infantry unit. In either case, broadcast bandwidth is needlessly wasted by transmitting messages to nodes in the network that cannot assist the requesting node. What is therefore needed is a communications protocol that conserves communications resources while ensuring messages are transmitted to the desired nodes in a mobile ad-hoc network.

It is therefore an object of the invention to provide a communications protocol that conserves communications resources such as broadcast bandwidth.

It is another object of the invention to transmit messages in an ad-hoc mobile network such that nodes of a specific type receive the message.

It is still another object of the invention to transmit messages in an ad-hoc mobile network such that nodes of a specific type and distance from a transmitting node receive the message.

A feature of the invention is a method of transmitting a message directed to a specific type of network node within a predetermined distance from the transmitting node.

An advantage of the invention is the conserving of communications resources by limiting the actual distance a message is to be transmitted through the network.

SUMMARY OF THE INVENTION

The invention provides a method of communicating in a wireless ad-hoc communications network. The network includes a plurality of nodes configured for wireless communication therebetween. According to the method, a receiving node receives a message originating from a source node. The receiving and source nodes are included in the network. It is determined whether the receiving node is of a node type intended to process the message. It is determined whether the receiving node is less than a predetermined distance from the source node. The message is processed by the receiving node when the receiving node is of the node type intended to process the message and when the receiving node is less than a predetermined distance from the source node.

The invention also provides a method of communicating in a wireless adhoc communications network. The network includes a plurality of nodes configured for wireless communication therebetween. According to the method, a receiving node receives a message originating from a source node. It is determined whether the receiving node is of a first node type intended to process the message. It is determined whether the receiving node is less than a first predetermined distance from the source node. The first predetermined distance is associated with transmissions to nodes of the first node type. It is determined whether the receiving node is of a second node type intended to process the message. It is determined whether the receiving node is less than a second predetermined distance from the source node. The second predetermined distance is associated with transmissions to nodes of the second node type. The receiving node processes the message when either the receiving node is of the first node type and the receiving node is less than the first predetermined distance from the source node, or the receiving node is of the second node type and the receiving node is less than the second predetermined distance from the source node.

The invention further provides a wireless ad-hoc network. A plurality of communications devices communicate with each other. Each of the devices is one of a plurality of device types. A message from one of the devices contains an instruction to process the message only by devices of a predetermined device type that are within a predetermined distance from said one of the devices.

BRIEF DESCRIPTION OF THE DRAWINGS

FIG. 2 is a schematic diagram of a node or device according to the invention.

FIG. 3 is a schematic representation of a message transmitted according to the invention.

DETAILED DESCRIPTION OF THE DRAWINGS

Figure 1:
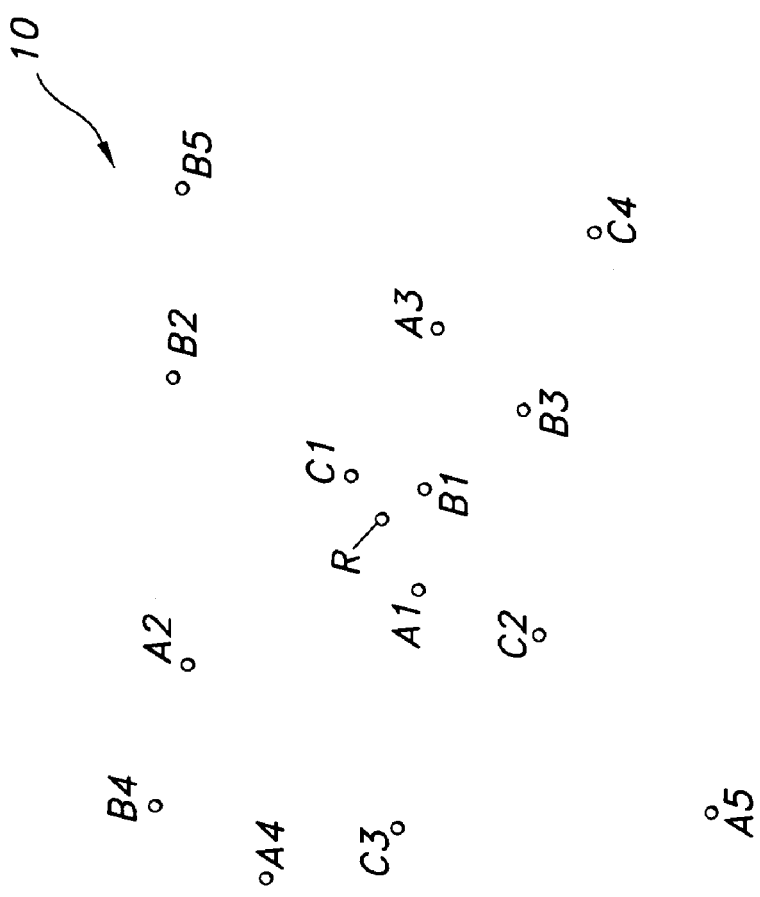
FIG. 1 is a schematic representation of a wireless ad-hoc network.

The invention provides a method of communicating with various types or classes of nodes in an ad-hoc network, where the actual distance from a transmitting node that a message is sent depends upon the type or class of node to which the message is desired to be sent. FIG. 1 schematically shows a mobile ad-hoc network 10 of communication devices. Each of the devices, also known as nodes, is capable of independent movement and of communicating with one or more of the other nodes in the network. The connectivity of the network is not shown, but it can be assumed that some of the nodes are not directly connected to other nodes in the network. In other words, a transmission from node B4 to node C4 may require an intermediate transmission, or hop, to one or more nodes between nodes B4 and C4. It is further assumed that nodes can enter and exit the network at any time, and that the topology and connectivity of the network can also change based upon the nodes participating in the network at a given time. The nodes in network 10 comprise three different node types. The first node type A includes nodes A1, A2, A3, A4, and A5. The second node type B includes nodes B1, B2, B3, B4, and B5. The third node type C includes nodes C1, C2, C3, and C4. Each node type is differentiated in some respect from other node types by mobility or non-communications capabilities. For example, if network 10 is a network of military resources such as infantry, tanks, helicopters, or the like, each node of first node type A may be associated with a unit of infantry, each node of second node type B may be associated with a tank squadron, and each node of third node type C may be associated with a helicopter.

FIG. 2 shows a basic communicating device 20 included with each node in network 10. Device 20 includes an input 22, which may comprise one or more sensors, a camera, or a data input device such as a keyboard. Device 20 also includes a geolocator unit 24 that receives signals from earth-orbiting satellites and/or earth-bound transmitting or relay stations and derives a precise geographic location of the geolocator unit from such signals. The geolocator unit may comprise a global positioning system (GPS) or similar types of locating systems. Input 22 and geolocator unit 24 provide information to a processor 26, which assembles the information into a message 30. The message is sent to, and transmitted by, a transceiver 29, which includes components necessary to transmit the message according to the frequencies and communication protocols used or recognized by the network. The components comprising device 20 may be integral in a single assembly, or alternatively may be separate components that together perform the functions of device 20.

Message 30 is shown in more detail in FIG. 3. The message comprises a data portion 32 and a header portion 34. data portion 32 contains information desired to be communicated via the network. Header portion 34 contains information concerning how, when, and to whom the message is to be transmitted across the network. Specifically, according to the invention the header portion contains the location 35 of the node transmitting the message as well as instructions on which type or types of nearby nodes the message is to be processed by. For example, section 36 of header portion 34 states the message is to be processed by nodes of the first node type (A1, A2, etc.) that are within five miles of the location of the node transmitting the message. Section 38 of header portion 34 states the message is to be processed by nodes of the second type (B1, B2, etc.) that are within 15 miles of the location of the node transmitting the message. In the illustrated example header portion 34 contains no instructions to have the message processed by nodes of the third type (C1, C2, etc.).

Figure 4:
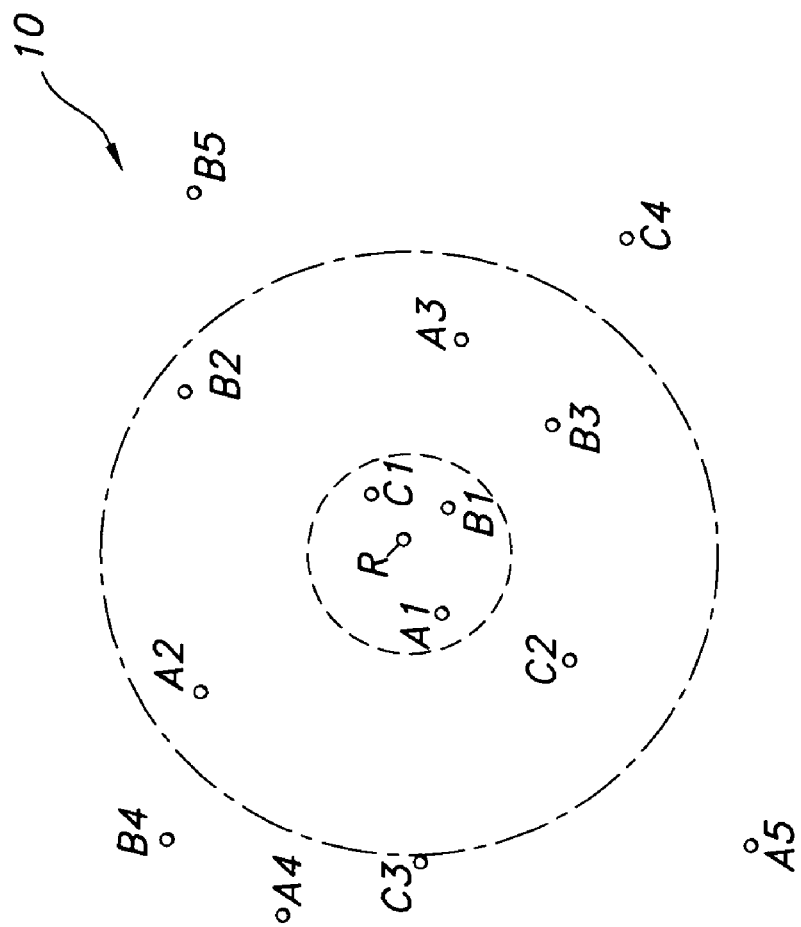
FIG. 4 is a schematic diagram of a wireless ad-hoc network.

The effect of such instructions in header portion 34 is shown in FIG. 4, in which a transmitting node R transmits message 30. Each node that receives the message reads header portion 34 to determine whether the receiving node is the type of node to which the message is directed. Using location 35 of transmitting node R as well as the known location of the receiving node, the receiving node determines the actual distance between the receiving node and the transmitting node. The receiving node then determines whether the actual distance to the transmitting node is less than the distance specified in header portion 34 for the node type associated with the receiving node. If so, the receiving node processes data portion 32 of message 30. On the other hand, if the receiving node reads header portion 34 and determines that the message is not specified to be processed by nodes of its node type, the receiving node does not process the data portion of the message. Nodes of the various node types treat message 30 differently as follows:

Node Type A: Message 30 is intended to be processed by any node of the first node type that is within five miles of the transmitting node. The circle 36a represents the actual distance or range specified in section 36 of header portion, i.e., five miles. Therefore, node A1 processes the message because node A1 is within the range specified in section 36. Nodes A2, A3, A4 and A5 are not within the specified range, as illustrated by their position outside of circle 36a, and so those nodes do not process the message.

Node Type B: Message 30 is further intended to be processed by any node of the second node type within fifteen miles of the transmitting node. The circle 38a represents the actual distance or range specified in section 38 of the header portion, i.e., 15 miles. Therefore, nodes B1, B2 and B3 process the message because those nodes are within the range specified in section 38 and illustrated by circle 38a. Nodes B4 and B5 are not within the specified range, as illustrated by their position outside of circle 38a, and so those nodes do not process the message.

Node Type C: Because message 30 does not instruct nodes of the third node type to process the message, none of the nodes of the third node type process the message.

Even if certain nodes are not to process the message according to the information in header portion 34, each node re-transmits the message if the node is within the distance contained in sections 36 and/or 38. If the node is not within the distance, the node does not re-transmit the message. Alternatively or additionally, some of the non-processing nodes may be required to re-transmit the message to other nodes because of the topology and/or connectivity of the network For example, if in FIG. 4 transmitting node R can communicate with node B2 only through node C1, node C1 must transmit the message to node B2 even though node C1 does not process data portion 32 of the message.

The invention as described herein can be advantageously implemented in a network where different classes or types of nodes in an ad-hoc network have different capabilities. For example, network 10 may be a network of military resources where node types A, B and C are associated an infantry unit, a tank squadron, and a helicopter, respectively. Each of these types of resources has different mobility and armament capabilities. A transmission from transmitting node R, such as a request for assistance, may come from a downed pilot or from a forward observer that has located an enemy military target. For the purposes of the specific request, some infantry units (node type A) in the network may be too far away to assist the requesting node within a desired time, and so messages comprising the request for assistance are sent only to those infantry units that are within a first effective assistance range (i.e., circle 36a) from the transmitting node. A tank squadron (node type B) is more mobile than an infantry unit and has weapons with a greater range, and so the request for assistance is sent to tank squadrons that are within a second effective assistance range (i.e., circle 38a) from the transmitting node. Tank squadrons outside of the effective assistance range do not process messages comprising the request for assistance from the transmitting node because such tank squadrons cannot timely support action requested by the transmitting node. A helicopter, while more mobile than either an infantry unit or a tank squadron, may not be required for the specific mission corresponding to the request for assistance, and therefore in this instance does not process messages from the transmitting node.

The invention is useful where a certain node desires to monitor, at a given time, the status of certain nodes in the network. For example, transmitting node R may be associated with a military or a search-and-rescue command center that needs to be aware of the existence, locations and capabilities of certain resources in a geographic area. To do so, the command center transmits a onetime or periodic command message across the network, instructing for example all tanks within 150 miles and all helicopters within 300 miles to transmit a response message back to the command center. The command message is transmitted through the network as described herein, and nodes satisfying the node type and distance requirements of the message transmit response messages back to the command center. In this manner, the command center can obtain a rapid understanding of resources within a geographic area.

The invention provides capabilities useful in forming task-specific sub-networks within an ad-hoc wireless network. For example, an ad-hoc network of military resources that includes a plurality of resource types (infantry, sensors, unmanned aerial vehicles, fixed-wing aircraft, helicopters, tanks, artillery, etc.) can be effectively deployed to accomplish specific missions or objectives by forming temporary sub-networks comprising nodes of various node types. The needs of a specific mission or objective determine the node types required for the corresponding sub-network. A military resource associated with a node is included within the sub-network when (a) the military resource is one of the required types, (b) the military resource is within an effective assistance range of the objective, and (c) the military resource has the capability of working to accomplish the objective. A resource has sufficient capability when it is prepared and is not otherwise committed to another mission or objective. Once a sub-network is formed, nodes within the sub-network can communicate directly with each other by, for example, reserving a specific frequency or channel upon which to broadcast messages to each other. Alternatively, nodes in the sub-network can communicate on a frequency or channel common to all nodes in the network, but can limit unnecessary transmissions by including an instruction in the header of transmitted messages to only transmit the messages to members of the subnetwork. Nodes not part of the sub-network either refrain from re-transmitting the messages, or pass the messages to nodes in the sub-network if mandated by network topology or connectivity considerations. A sub-network is dissolved when the objective or mission is accomplished.

The invention has been particularly described as being used in an ad-hoc network of military resources. However, non-military networks may also benefit from the invention, such as search-and-rescue operations and emergency or protective services networks. Another application is in civilian wireless networks, such as wireless computer networks connected using the IEEE 802.11 protocol. Using the invention, a mobile or portable computer may broadcast a request for a nearby resource, such as a printer within 800 meters. Provided the request contains location information of the requesting portable computer, each node in the wireless network will forward the request through the network until nearby requested resources are identified.

The invention provides an effective way to conserve communications resources in a mobile ad-hoc network. An advantage of the invention is that because messages are transmitted only to nodes of one or more specified node types, fewer total transmissions throughout the network are needed to transmit information to the required recipients.

Another advantage is that because messages are transmitted only to nodes of certain types and that are within predetermined distances from a transmitting node, communications to nodes distant from a transmitting node are eliminated. Communications resources are thereby conserved because transmissions are only sent to those nodes that meet the node type and distance criteria set by the transmitting node.

Still another advantage is that the invention enables ad-hoc sub-networks to be formed in real time, where the sub-networks comprise nodes of different node types. Such forming of multi-type sub-networks permits the accomplishment of specific missions or objectives based upon available capabilities of the nodes in the network.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of communicating in a wireless adhoc communications network, the network including a plurality of nodes configured for wireless communication therebetween, the method comprising:

receiving, at a receiving node, a message originating from a source node, the receiving and source nodes being included in the plurality of nodes in the network;

determining whether the receiving node is of a node type intended to process the message;

determining whether the receiving node is less than a predetermined distance from the source node;

the receiving node processing the message when the receiving node is of the node type intended to process the message and when the receiving node is less than a predetermined distance from the source node;

wherein the message includes a position of the source node and a predetermined distance information, and further wherein determining whether the receiving node is less than a predetermined distance from the source node includes determining a position of the receiving node, comparing the position of the source node with the position of the receiving node to compute a distance between the source node and the receiving node, and determining whether the distance between the source node and the receiving node is less than the redetermined distance information.

2. The method of claim 1, further comprising:

the receiving node transmitting the message to another node in the network when said other node is of the node type intended to process the message and when said other node is less than the predetermined distance from the source node.

3. The method of claim 1, further comprising:

the receiving node transmitting the message to another node in the network when the receiving node is less than a predetermined distance from the source node.

4. The method of claim 1, wherein the message includes direction information that indicates which node type is to process the message, and further wherein determining whether the receiving node is of a node type intended to process the message comprises comparing the node type of the receiving node with the direction information in the message.

5. The method of claim 1, wherein the node type is one of a plurality of node types in the network, and wherein each of the plurality of node types is differentiated from others of the plurality of node types by non-communications characteristics.

6. The method of claim 5, wherein the non-communications characteristics include an ability to perform a non-communications task within a required time.

7. The method of claim 5, further comprising:

forming a sub-network within the network to accomplish an objective, wherein node types of nodes in the sub-network are selected as a function of the objective to be accomplished, and further wherein nodes are formed into the sub-network based upon a distance from each node to a location related to the objective to be accomplished.

8. The method of claim 1, wherein the message is a first message, and further wherein the first message contains an instruction for the receiving node to transmit a second message to the source node.

9. A method of communicating in a wireless ad-hoc communications network, the network including a plurality of nodes configured for wireless communication therebetween, the method comprising:

receiving, at a receiving node, a message originating from a source node, the receiving and source nodes being included in the plurality of nodes in the network;

determining whether the receiving node is of a first node type intended to process the message;

determining whether the receiving node is less than a first predetermined distance from the source node, the first predetermined distance being associated with transmissions to nodes of the first node type;

determining whether the receiving node is of a second node type intended to process the message;

determining whether the receiving node is less than a second predetermined distance from the source node, the second predetermined distance being associated with transmissions to nodes of the second node type;

the receiving node processing the message when at least one of the receiving node is of the first node type and the receiving node is less than the first predetermined distance from the source node, and the receiving node is of the second node type and the receiving node is less than the second predetermined distance from the source node is true.

10. The method of claim 9, further comprising:

the receiving node transmitting the message to another node in the network when said other node is of the first node type and when said other node is less than the first predetermined distance from the source node.

11. The method of claim 9, wherein the message includes direction information that indicates which node type is to process the message, and further wherein determining whether the receiving node is of a node type intended to process the message comprises comparing the node type of the receiving node with the direction information in the message.

12. The method of claim 9, wherein the message includes a position of the source node, a first predetermined distance information and a second predetermined distance information, and further wherein determining whether the receiving node is less than one of the first and second predetermined distances from the source node further comprises:

determining a position of the receiving node;

comparing the position of the source node with the position of the receiving node to compute a distance between the source node and the receiving node; and determining whether the distance between the source node and the receiving node is less than one of the first predetermined distance information and the second predetermined distance information.

13. The method of claim 9, wherein the nodes of the first node type have different non-communications characteristics from nodes of the second node type, said non-communications characteristics including an ability to perform a non-communications task within a required time.

14. The method of claim 13, further comprising:

forming a sub-network within the network to accomplish an objective, wherein nodes in the sub-network are selected as a function of the objective to be accomplished, and further wherein nodes are formed into the sub-network based upon a distance from each node to a location related to the objective to be accomplished.

15. A wireless ad-hoc network, comprising:

a plurality of communications devices communicating with each other, each of the devices being of one of a plurality of device types;

wherein a message from one of the devices contains an instruction to process the message only by devices of a predetermined device type that are within a predetermined distance from said one of the devices;

wherein the message further contains a position of said one of the devices and information relating to the predetermined distance, and further wherein the position of said one of the devices is compared with a position of a device receiving the message to determine a distance therebetween, and wherein said distance is compared with the information relating to the predetermined distance to determine whether the device receiving the message is within the predetermined distance.

16. The network of claim 15, wherein each of the plurality of device types is differentiated from others of the plurality of device types by non-communications characteristics, said the non-communications characteristics including an ability to perform a non-communications task within a required time.

17. The network of claim 15, wherein each of the communications devices in the network comprises:
  a position locator that determines a position of the communications device;
  a processing element that incorporates the position of the communications device into messages sent by the communications device and compares the position of the communications device to a location of said one of the devices; and
  a transceiver that sends and receives messages from other devices in the network.

18. The network of claim 17, wherein the position locator is a Global Positioning System (GPS) receiver.

* * * * *